(12) United States Patent
Nemoto (10) Patent No.: US 10,697,066 B2
(45) Date of Patent: Jun. 30, 2020

(54) METHOD FOR FORMING MULTI-LAYERED COATING FILM

(71) Applicant: KANSAI PAINT CO., LTD., Hyogo (JP)

(72) Inventor: Yukihiro Nemoto, Kanagawa (JP)

(73) Assignee: KANSAI PAINT CO., LTD., Hyogo (JP)

( * ) Notice: Subject to any disclaimer, the term of this patent is extended or adjusted under 35 U.S.C. 154(b) by 0 days.

(21) Appl. No.: 14/438,992

(22) PCT Filed: Jul. 30, 2014

(86) PCT No.: PCT/JP2014/070098
§ 371 (c)(1),
(2) Date: Apr. 28, 2015

(87) PCT Pub. No.: WO2015/016273
PCT Pub. Date: Feb. 5, 2015

(65) Prior Publication Data
US 2015/0292103 A1 Oct. 15, 2015

(30) Foreign Application Priority Data

Aug. 1, 2013 (JP) .................. 2013-160799
Aug. 12, 2013 (JP) .................. 2013-167905
Apr. 28, 2014 (JP) .................. 2014-092911

(51) Int. Cl.
| | |
|---|---|
| C25D 13/20 | (2006.01) |
| C23C 22/34 | (2006.01) |
| C09D 5/44 | (2006.01) |
| C23C 22/83 | (2006.01) |
| C09D 5/08 | (2006.01) |
| C23C 22/36 | (2006.01) |

(52) U.S. Cl.
CPC .............. C23C 22/367 (2013.01); C09D 5/08 (2013.01); C09D 5/4438 (2013.01); C09D 5/4453 (2013.01); C09D 5/4488 (2013.01); C23C 22/34 (2013.01); C23C 22/36 (2013.01); C23C 22/83 (2013.01); C25D 13/20 (2013.01)

(58) Field of Classification Search
CPC .......... C23C 22/367; C23C 22/34–368; C23C 22/22; C23C 22/06
See application file for complete search history.

(56) References Cited

U.S. PATENT DOCUMENTS

| | | | | |
|---|---|---|---|---|
| 5,380,374 | A * | 1/1995 | Tomlinson | C23C 22/34 148/247 |
| 5,418,263 | A | 5/1995 | Sakamoto et al. | |
| 6,758,916 | B1 * | 7/2004 | McCormick | C23C 22/34 148/247 |
| 8,273,190 | B2 * | 9/2012 | Rivera | C09D 5/084 148/247 |
| 2002/0008226 | A1 | 1/2002 | Chihara et al. | |
| 2003/0038031 | A1 * | 2/2003 | Nojiri | C09D 5/4457 204/502 |
| 2004/0007249 | A1 * | 1/2004 | Kishi | C23C 22/00 134/2 |
| 2004/0187967 | A1 * | 9/2004 | Matsukawa | C23C 22/34 148/247 |

(Continued)

FOREIGN PATENT DOCUMENTS

| | | |
|---|---|---|
| CN | 1094739 | 11/1994 |
| EP | 2 302 098 | 3/2011 |

(Continued)

OTHER PUBLICATIONS

KBP-90 Product Description, Shin-Etsu Silicones of America, Inc., retrieved on Sep. 23, 2019 from http://www.shinetsuamerica.com/files/products/KBP-90.pdf (Year: 2019).*

(Continued)

*Primary Examiner* — Monique R Jackson
(74) *Attorney, Agent, or Firm* — Wenderoth, Lind & Ponack, L.L.P.

(57) ABSTRACT

An object of the present invention is to provide a method for forming a multilayer coating film, the method capable of achieving excellent finished appearance and excellent corrosion resistance without affecting electrodeposition coatability even when a part or all of the water-washing step is omitted after chemical conversion treatment, and to provide a coated article. The invention provides a method for forming a multilayer coating film, comprising forming a chemical conversion coating film and an electrodeposition coating film on a metal substrate by Step 1 of immersing a metal substrate in a chemical conversion treatment solution to form a chemical conversion coating film, and Step 2 of omitting a part or all of the water-washing step, and performing electrodeposition coating on the metal substrate using a cationic electrodeposition coating composition to form an electrodeposition coating film, wherein the chemical conversion treatment solution contains less than 500 ppm of sodium ions on a mass basis, and hexafluorozirconic acid. The chemical conversion treatment solution preferably contains no less than 5 ppm to less than 50 ppm of sodium ions, no less than 5 ppm to less than 90 ppm of calcium ions, less than 100 ppm of potassium ions, and less than 90 ppm of magnesium ions, on a mass basis; and is used continuously.

5 Claims, 1 Drawing Sheet

(56) References Cited

U.S. PATENT DOCUMENTS

| | | | |
|---|---|---|---|
| 2006/0173113 A1* | 8/2006 | Yabuta | B05D 1/04 |
| | | | 524/439 |
| 2008/0145678 A1 | 6/2008 | McMurdie et al. | |
| 2009/0101512 A1 | 4/2009 | Kubota | |
| 2010/0270162 A1* | 10/2010 | Nishiguchi | C08G 18/643 |
| | | | 205/50 |
| 2011/0094630 A1 | 4/2011 | Yoshida et al. | |

FOREIGN PATENT DOCUMENTS

| JP | 2001-323384 | 11/2001 |
|---|---|---|
| JP | 2006-28543 | 2/2006 |
| JP | 2007-313420 | 12/2007 |
| JP | 2009-149974 | 7/2009 |

OTHER PUBLICATIONS

International Search Report dated Nov. 4, 2014 in International (PCT) Application No. PCT/JP2014/070098.
Extended European Search Report dated Apr. 21, 2017 in corresponding European Application No. 14832983.2.

* cited by examiner

METHOD FOR FORMING MULTI-LAYERED COATING FILM

CROSS-REFERENCE OF RELATED APPLICATIONS

This application claims priority to JP2013-160799A, filed Aug. 1, 2013; JP2013-167905A, filed Aug. 12, 2013; and JP2014-092911A, filed Apr. 28, 2014, the disclosures of which are incorporated herein by reference in their entirety.

TECHNICAL FIELD

The present invention relates to a method for forming a multilayer coating film, the method being capable of performing electrodeposition coating without being affected by a chemical conversion treatment solution even when a part or all of the water-washing step is omitted after chemical conversion treatment, and being capable of thereby providing a coated article having excellent finished appearance and excellent corrosion resistance. The present invention also relates to a coated article obtained using this method for forming a multilayer coating film.

BACKGROUND ART

Until now, metal substrates for industrial use have been subjected to chemical conversion treatment for treating the base surface to improve corrosion resistance and adhesion. However, chemical conversion treatment solutions contain large amounts of various ionic components, as well as large amounts of heavy metal components, such as zinc, nickel, and manganese, to improve the properties of the resulting chemical conversion coating film.

When electrodeposition coating is performed using a cationic electrodeposition coating composition directly after the chemical conversion treatment, it is known that an excess of the chemical conversion treatment solution attached to or deposited on the metal substrate adversely affects the electrodeposition coatability, finished appearance, corrosion resistance, and the like.

Figure 1:
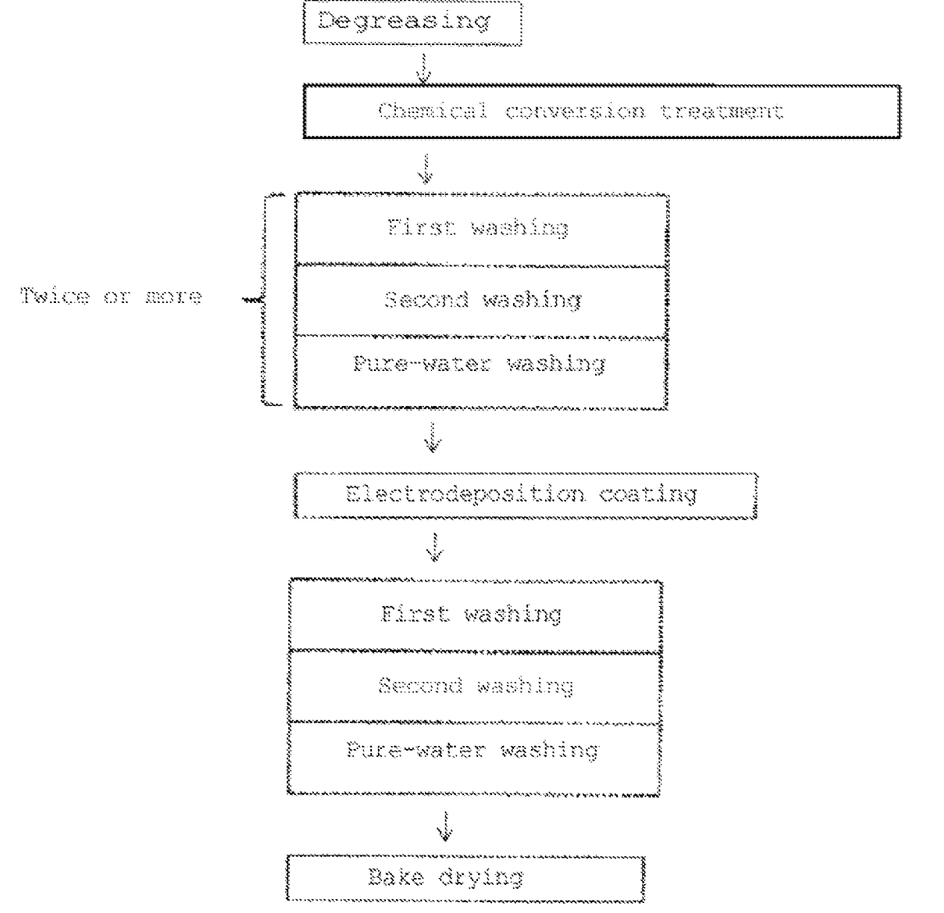
FIG. 1 shows a schematic flow of a known method for forming a multilayer coating film.

Therefore, a typical coating line includes a water-washing step, which requires considerable man-hours and time for degreasing treatment, chemical conversion treatment, first water washing, second water washing, pure-water washing, electrodeposition coating, first water washing, second water washing, pure-water washing, and bake drying, as shown in FIG. 1. Furthermore, collection, filtration, treatment, disposal, etc., of wastewater from the water-washing step also require massive equipment and costs.

Patent Literature (PTL) 1 discloses a method for forming a multilayer coating film that enables process streamlining and space savings. In this method, electrodeposition coating is performed without performing water washing after chemical conversion treatment. PTL 1 discloses that even when a chemical conversion treatment solution is carried as a contaminant into an electrodeposition coating composition in the subsequent step, it is possible to obtain a coated article with excellent finished appearance and excellent corrosion resistance without affecting electrodeposition coatability and coated-film properties. However, when water washing is not performed, and if more than specific amounts of sodium ions and potassium ions are attached to the substrate and/or are carried into the electrodeposition coating composition, it is possible that sufficient corrosion resistance and finished appearance are not achieved.

Patent Literature (PTL) 2 discloses a precoating process. In this process, a substrate is subjected to degreasing, washing, and then, without performing surface conditioning, application of a chemical conversion coating solution. Thereafter, electrodeposition coating is performed without washing with industrial water or drying the resulting substrate. In this process also, it is possible that sufficient corrosion resistance and finished appearance are not achieved, as in PTL 1 above. PTL 2 also discloses that when the chemical conversion treatment solution has a low pH, a water-washing step is required between the chemical conversion step and the electrodeposition coating step to prevent rusting.

Patent Literature (PTL) 3 defines the hydrophobic solvent amount and sodium ion concentration in an electrodeposition coating composition bath to lower the minimum temperature for forming a coating film of an electrodeposition coating composition and to thereby prevent a bridging phenomenon from occurring in narrow gap portions. However, PTL 3 is silent about reducing the concentrations of sodium ions and potassium ions in a chemical conversion treatment solution, and about achieving process streamlining or space savings by omitting the water-washing step. Therefore, if water washing is omitted, sodium ions and potassium ions attached to the substrate during chemical conversion treatment can deteriorate the electrodeposition coatability, as well as the corrosion resistance and finished appearance.

Patent Literature (PTL) 4 discloses a method for performing chemical conversion treatment by dipping treatment using an acidic zinc phosphate aqueous solution. In relation to this, PTL 4 defines the sodium ion concentration in the zinc nitrite aqueous solution used as an accelerator. PTL 4 discloses in paragraph [0016] that when the sodium ion concentration is 10,000 ppm on a weight basis in a chemical conversion treatment tank, an excellent chemical conversion coating film is obtained. However, when sodium ions are contained at a high concentration as above, the water-washing step cannot be omitted, and it is thus difficult to achieve process streamlining and space savings.

CITATION LIST

Patent Literature

PTL 1: JP2009-149974A
PTL 2: JP2006-28543A
PTL 3: JP2007-313420A
PTL 4: JP2001-323384A

SUMMARY OF INVENTION

Technical Problem

An object of the present invention is to provide a method for forming a multilayer coating film, the method enabling process streamlining and space savings. Another object of the present invention is to provide a coated article that has excellent finished appearance and excellent corrosion resistance without affecting electrodeposition coatability even when a part or all of the water-washing step after chemical conversion treatment is omitted.

Solution to Problem

The present inventor conducted extensive research and found that the above objects can be achieved by using a specific chemical conversion treatment solution in a method for forming a multilayer coating film, the method comprising forming a chemical conversion coating film on a metal substrate, followed by electrodeposition coating. The present invention has been accomplished based on this finding.

More specifically, the present invention provides the following methods for forming a multilayer coating film and coated article.

Item 1. A method for forming a multilayer coating film, the method comprising forming a chemical conversion coating film and an electrodeposition coating film on a metal substrate by the following steps:

Step 1: immersing a metal substrate in a chemical conversion treatment solution to form a chemical conversion coating film; and Step 2: performing electrodeposition coating on the metal substrate by using a cationic electrodeposition coating composition to form an electrodeposition coating film, wherein the chemical conversion treatment solution contains less than 500 ppm of sodium ions on a mass basis.

Item 2. The method for forming a multilayer coating film according to Item 1, wherein in step 2, a part or all of the water-washing step before electrodeposition coating is omitted.

Item 3. The method for forming a multilayer coating film according to Item 1 or 2, wherein the chemical conversion treatment solution contains less than 500 ppm of potassium ions on a mass basis.

Item 4. The method for forming a multilayer coating film according to any one of Items 1 to 3, wherein the chemical conversion treatment solution contains 30 to 20,000 ppm of at least one metal compound component (M) comprising at least one metal compound selected from zirconium, titanium, cobalt, aluminum, vanadium, tungsten, molybdenum, copper, zinc, indium, bismuth, yttrium, iron, nickel, manganese, gallium, silver, and lanthanoid metals, as the total metal content on a mass basis.

Item 5. The method for forming a multilayer coating film according to any one of Items 1 to 4, wherein the chemical conversion treatment solution contains a water-dispersible or water-soluble resin composition (P) in an amount of 0.01 to 40 mass %.

Item 6. The method for forming a multilayer coating film according to any one of Items 1 to 5, wherein the cationic electrodeposition coating composition contains an amino group-containing epoxy resin (A) and a blocked polyisocyanate (B), the amino group-containing epoxy resin (A) being contained in an amount of 40 to 90 mass %, and the blocked polyisocyanate (B) being contained in an amount of 10 to 60 mass %, based on the total resin solids content.

Item 7. The method for forming a multilayer coating film according to any one of Items 1 to 6, wherein the metal substrate is subjected to at least one of air blowing, shaking, and rotating, before performing electrodeposition coating in step 2.

Item 8. A coated article having a multilayer coating film formed by using the method for forming a multilayer coating film of any one of Items 1 to 7.

Advantageous Effects of Invention

In the method for forming a multilayer coating film of the present invention, the omission of a part or all of the water-washing step after chemical conversion treatment does not affect electrodeposition coatability, and a coated article having excellent finished appearance and excellent corrosion resistance is obtained. The method for forming a multilayer coating film of the present invention uses a specific chemical conversion treatment solution. This makes it possible to omit a part or all of the water-washing step, enabling process streamlining and space savings, as well as reducing the size of various equipment for effluent treatment and the amount of waste products.

In the present invention, the water-washing step can be omitted. (A part or all of the step is omitted to achieve process streamlining and space savings.) Along with this, it is possible for the present invention to achieve excellent finished appearance and excellent corrosion resistance. The reason for this is not known for certain. The following are possible reasons. A main reason is that when a part or all of the water-washing step is omitted, and electrodeposition coating is performed using a cationic electrodeposition coating composition on a metal substrate in a state in which cations, such as sodium ions and potassium ions, included in the chemical conversion treatment solution are attached to its surface, the application and the coating film formation of the electrodeposition coating composition is presumably inhibited, causing deterioration in finished appearance and/or corrosion resistance.

Therefore, in the method for forming a multilayer coating film of the present invention, when a part or all of the water-washing step is omitted, it is believed to be important to adjust the concentrations of sodium ions and potassium ions in the chemical conversion treatment solution within specific ranges (it also being preferable to adjust the concentrations of calcium ions and magnesium ions in the chemical conversion treatment solution within specific ranges), so as not to allow an excess of the chemical conversion treatment solution to attach to or deposit on the substrate. Further, the omission of a part or all of the water-washing step greatly reduces the amount of water required for washing.

DESCRIPTION OF EMBODIMENTS

The method for forming a multilayer coating film according to a preferable embodiment of the present invention uses a multilayer coating film formation equipment comprising a chemical conversion treatment tank and an electrodeposition coating composition tank. A metal substrate is immersed in the chemical conversion treatment tank filled with a specific chemical conversion treatment solution to form a chemical conversion coating film on the metal substrate with or without the application of electric current. Then, a part or all of the water-washing step is omitted, and the metal substrate having a chemical conversion coating film is immersed in the electrodeposition coating composition tank filled with a cationic electrodeposition coating composition to perform electrodeposition coating.

Specific descriptions are provided below.

Substrate

The metal substrate used in the method for forming a multilayer coating film of the present invention is not limited as long as electrodeposition coating can be performed on the substrate. Examples of the substrate include cold-rolled steel plates, alloyed hot-dip zinc-coated steel plates, electrogalvanized steel plates, electrolytic zinc-iron duplex plated steel plates, organic composite plated steel plates, Al materials, Mg materials, and like metal substrates. These may be suitably used singly, as an alloy of two or more metals, or as a substrate comprising a combination of two or more metals. These metal substrates may have optionally been subjected to degreasing, surface conditioning, water washing, and other treatments.

Chemical Conversion Treatment Solution

The chemical conversion treatment solution used in the method for forming a multilayer coating film (step 1) of the present invention is characterized in that it contains sodium ions at a concentration of less than 500 ppm on a mass basis.

If the sodium ion concentration is higher than 500 ppm, and a part or all of the water-washing step is omitted, the coatability in electrodeposition coating will be insufficient, and the finished appearance and corrosion resistance of the resulting coating film will be unsatisfactory. The sodium ion concentration in the chemical conversion treatment solution is on a mass basis preferably less than 500 ppm, more preferably less than 200 ppm, still more preferably less than 100 ppm, yet still more preferably less than 50 ppm, and particular preferably less than 10 ppm.

Sodium ions are presumably incorporated into the chemical conversion treatment solution from, for example, starting materials, such as water, an accelerator (e.g., sodium nitrite), a metal compound component (M) mentioned later, and a neutralizing agent, as well as from a degreasing solution and washing water, which are used in the preceding step. For example, a continuous use of a chemical conversion treatment solution in a production line or the like gradually reduces the concentrations of chemical conversion treatment components; therefore, a supply solution is generally added to adjust the concentrations as needed. However, trace amounts of impurity components (e.g., Na ions) in the supply solution or components carried from the previous step gradually accumulate in the chemical conversion treatment solution, causing an adverse effect on the properties. In the present invention, a specific ionic concentration in the chemical conversion treatment solution is adjusted to a specific level or less, thereby achieving excellent properties even when the production is continuously performed.

For the same reason as described above, the potassium ion concentration in the chemical conversion treatment solution on a mass basis is preferably less than 500 ppm, more preferably less than 200 ppm, still more preferably less than 100 ppm, and yet still more preferably less than 50 ppm.

Further, the concentrations of calcium ions and magnesium ions in the chemical conversion treatment solution are on a mass basis each also generally preferably less than 500 ppm, more preferably less than 200 ppm, and still more preferably less' than 90 ppm.

The concentrations of sodium ions, potassium ions, calcium ions, and magnesium ions in the chemical conversion treatment solution may be determined by using an atomic absorption analytical method with an atomic absorption spectrometer (trade name, produced by Hitachi, a Zeeman atomic absorption photometer).

The composition of the chemical conversion treatment solution used in the method for forming a multilayer coating film of the present invention comprises the following metal compound component (M), and optionally a water-dispersible or water-soluble resin composition (P), and the like.

Metal Compound Component (M)

The chemical conversion treatment solution used in the method for forming a multilayer coating film of the present invention preferably contains 30 to 20,000 ppm of a metal compound component (M) as the total metal content (mass basis).

The metal compound component (M) is not limited as long as the sodium ion concentration in the chemical conversion treatment solution does not exceed the concentration mentioned above. Examples thereof include zirconium compounds, titanium, cobalt, aluminum, vanadium, tungsten, molybdenum, copper, zinc, indium, bismuth, yttrium, iron, nickel, manganese, gallium, silver, lanthanoid metals (lanthanum, cerium, praseodymium, neodymium, samarium, europium, gadolinium, terbium, dysprosium, holmium, erbium, thulium, ytterbium, and lutetium), and the like. It is preferable for the metal compound component (M) to comprise a zirconium compound. These may be used singly or in a combination of two or more.

The zirconium compound usable in the metal compound component (M) include compounds that generate zirconium-containing ions, such as zirconium ions, oxyzirconium ions, and fluorozirconium ions. Examples of compounds that generate oxyzirconium ions include zirconyl nitrate, zirconyl acetate, zirconyl sulfate, and the like. Examples of compounds that generate fluorozirconium ions include zirconium hydrofluoric acid, sodium zirconium fluoride, potassium zirconium fluoride, lithium zirconium fluoride, ammonium zirconium fluoride, and the like. Of these, zirconyl nitrate and ammonium zirconium fluoride are particularly preferable.

Examples of compounds that generate titanium ions include titanium chloride and titanium sulfate. Examples of compounds that generate fluorotitanium ions include titanium hydrofluoric acid, sodium zirconium fluoride, potassium titanium fluoride, lithium titanium fluoride, ammonium titanium fluoride, and the like. Of these, ammonium titanium fluoride is particularly preferable.

Examples of compounds that generate cobalt ions include cobalt chloride, cobalt bromide, cobalt iodide, cobalt nitrate, cobalt sulfate, cobalt acetate, ammonium cobalt sulfate, and the like. Of these, cobalt nitrate is particularly preferable.

Examples of compounds that generate aluminum ions include aluminium phosphate, aluminium nitrate, aluminum carbonate, aluminium sulfate, aluminium acetate, aluminum formate, aluminum oxalate, aluminum lactate, aluminum malonate, aluminum tartarate, aluminum ascorbate, and the like. Of these, aluminium sulfate is particularly preferable.

Examples of compounds that generate vanadium ions include lithium orthovanadate, sodium orthovanadate, lithium metavanadate, potassium metavanadate, sodium metavanadate, ammonium metavanadate, sodium pyrovanadate, vanadyl chloride, vanadyl sulfate, and the like. Of these, ammonium metavanadate is particularly preferable.

Examples of compounds that generates tungsten ions include lithium tungstate, sodium tungstate, potassium tungstate, ammonium tungstate, sodium metatungstate, sodium paratungstate, ammonium pentatungstate, ammonium heptatungstate, sodium phosphotungstate, barium borotungstate, and the like. Of these, ammonium tungstate and the like are particularly preferable.

Examples of compounds that generate molybdenum ions include lithium molybdate, sodium molybdate, potassium molybdate, ammonium heptamolybdate, calcium molybdate, magnesium molybdate, strontium molybdate, barium molybdate, phosphomolybdic acid, sodium phosphomolybdate, zinc phosphomolybdate, and the like.

Examples of compounds that generate copper ions include copper sulfate, copper(II) nitrate trihydrate, copper(II) ammonium sulfate hexahydrate, cupric II oxide, copper phosphate, and the like. Examples of compounds that generate zinc ions include zinc acetate, zinc lactate, zinc oxide, and the like.

Examples of compounds that generate indium ions include ammonium indium nitrate and the like.

Examples of compounds that generate bismuth ions include inorganic bismuth-containing compounds, such as bismuth chloride, bismuth oxychloride, bismuth bromide, bismuth silicate, bismuth hydroxide, bismuth trioxide, bismuth nitrate, bismuth nitrite, and bismuth oxycarbonate; and bismuth lactate, triphenylbismuth, bismuth gallate, bismuth benzoate, bismuth citrate, bismuth methoxyacetate, bismuth acetate, bismuth formate, bismuth 2,2-dimethylolpropionate, and the like.

Examples of compounds that generate yttrium ions include yttrium nitrate, yttrium acetate, yttrium chloride, yttrium sulfamate, yttrium lactate, yttrium formate, and the like.

Examples of compounds that generate iron ions include iron(II) chloride, iron(III) chloride, ammonium iron(III) citrate, ammonium iron(III) oxalate, iron(III) nitrate, iron (III) fluoride, iron(III) sulfate, ammonium iron(III) sulfate, and the like.

Examples of compounds that generate nickel ions include nickel(II) chloride, nickel(II) acetate, nickel(II) citrate, nickel(II) oxalate, nickel(II) nitrate, nickel(II) sulfamate, nickel (II) carbonate, nickel(II) sulfate, nickel(II) fluoride, and the like. Examples of compounds that generate manganese ions include manganese(II) acetate, manganese(III) acetate, manganese(II) oxalate, manganese(II) nitrate, manganese(II) carbonate, manganese(II) sulfate, ammonium manganese(II) sulfate, and the like.

Examples of compounds that generate gallium ions include gallium nitrate.

Examples of compounds that generate silver ions include silver(I) acetate, silver(I) chloride, silver (I) nitrate, and silver (I) sulfate.

In relation to lanthanoid metal compounds, examples of compounds that generate lanthanum ions include lanthanum nitrate, lanthanum fluoride, lanthanum acetate, lanthanum boride, lanthanum phosphate, lanthanum carbonate, and the like; examples of compounds that generate cerium ions include cerium(III) nitrate, cerium(III) chloride, cerium(III) acetate, cerium(III) oxalate, ammonium cerium(III) nitrate, diammonium cerium(IV) nitrate, and the like; examples of compounds that generate praseodymium ions include praseodymium nitrate, praseodymium sulfate, praseodymium oxalate, and the like; and examples of compounds that generate neodymium ions include neodymium nitrate, neodymium oxide, and the like.

The metal compound component (M) may further optionally contain at least one metal compound selected from the group consisting of alkali metals (lithium, sodium, potassium, rubidium, cesium, and francium) and alkaline earth metals (beryllium, magnesium, calcium, strontium, barium, and radium).

It is preferable for the metal compound component (M) used in the present invention to contain at least one zirconium compound and aluminium nitrate. It is more preferable for the metal compound component (M) to contain at least one zirconium compound.

Water-Dispersible or Water-Soluble Resin Composition (P)

The chemical conversion treatment solution used in the method for forming a multilayer coating film of the present invention may optionally contain a water-dispersible or water-soluble resin composition (P) in an amount of 0.01 to 40 mass %.

Examples of the water-dispersible or water-soluble resin composition (P) include cationic resin compositions containing, in the molecule, a group that can be converted into cations in an aqueous medium, such as an amino group, an ammonium salt group, a sulfonium salt group, and a phosphonium salt group.

Examples also include anionic resin compositions containing, in the molecule, a group that can be converted into anions in an aqueous medium, such as a carboxyl group, a sulfonic acid group, and a phosphoric acid group. Examples of the types of the resin include epoxy resins, acrylic resins, polybutadiene resins, alkyd resins, and polyester resins.

Among these functional groups, a cationic resin composition containing an amino group in the molecule is preferable because such a cationic resin composition causes no adverse effect even when mixed as a contaminant with a cationic electrodeposition coating composition, because rusting is prevented during the transport of a metal substrate coated with the chemical conversion treatment solution to the cationic electrodeposition coating composition tank, and because corrosion resistance of the resulting coated article is improved. The cationic resin composition containing an amino group is not particularly limited. Preferable examples include amino group-containing epoxy resins, polyallylamines, Mannich-modified, aminated phenolic resins, and the like. These may be used singly or in a combination of two or more. The resin preferably has an amine value of 30 to 150 mg KOH/g, and more preferably 60 to 130 mg KOH/g, based on the resin solids content.

The water-dispersible or water-soluble resin composition (P) is suitably mixed with a neutralizing agent and dispersed in deionized water to obtain an emulsion, which may be used to prepare the chemical conversion treatment solution.

In addition to the above resin, the components of the chemical conversion treatment solution may also include a resin or compound that contains in the molecule a nonionic and high polar functional group, such as hydroxyl group and oxyethylene chain, and that is water dispersible or water soluble in an aqueous medium. Specific examples of the resin or compound include polyvinyl alcohol, polyoxyethylene, polyvinylpyrrolidone, polyoxypropylene, hydroxyethyl cellulose, hydroxypropylmethyl cellulose, and the like. These may be used singly or in a combination of two or more.

The resin composition (P) contained in the chemical conversion treatment solution prevents a substrate from rusting while the substrate is transferred to the electrodeposition coating composition tank.

Preparation of Chemical Conversion Treatment Solution

The chemical conversion treatment solution used in the method for forming a multilayer coating film of the present invention may be prepared by using any method without limitation. For example, the following methods (1) to (3) may be used:

(1) a method comprising adding the metal compound component (M) to deionized water and/or the water-dispersible or water-soluble resin composition (P), optionally adding a neutralizing agent, and further adding deionized water;

(2) a method comprising adding deionized water and/or the water-dispersible or water-soluble resin composition (P) to the metal compound component (M);

(3) a method comprising adding the metal compound component (M) and/or the water-dispersible or water-soluble resin composition (P) to a chemical conversion treatment solution that has been previously prepared, and further adding deionized water.

The chemical conversion treatment solution contains the metal compound component (M) at a concentration of generally 30 to 20,000 ppm, preferably 50 to 10,000 ppm, more preferably 100 to 5,000 ppm, particularly preferably 150 to 2,000 ppm, as the total metal content (mass basis), and optionally further contains the water-dispersible or water-soluble resin composition (P) in an amount of generally 0.01 to 40 mass %, preferably 0.02 to 10 mass %, and still more preferably 0.03 to 1 mass %, based on the mass of the chemical conversion treatment solution. It is preferable that the pH be from 1.0 to 8.0, and more preferably 3.0 to 7.0.

Method for Forming a Chemical Conversion Coating Film

Examples of the method for forming a chemical conversion coating film include, but are not limited to, 1) a method in which a metal substrate is immersed in a chemical conversion treatment tank filled with a chemical conversion treatment solution for generally 10 to 360 seconds, preferably 50 to 300 seconds, and more preferably 70 to 240 seconds, to form a chemical conversion coating film on the metal substrate; 2) a method in which a metal substrate is immersed in a chemical conversion treatment tank filled with a chemical conversion treatment solution, and electric current is applied generally at 1 to 50 V for 10 to 360 seconds, and preferably 2 to 30 V for 30 to 180 seconds, using the metal substrate as the cathode; (3) a method in which a metal substrate is immersed in a chemical conversion treatment tank filled with a chemical conversion treatment solution for a specific period of time, followed by the application of electric current, the immersion being performed generally for 10 to 180 seconds, and preferably 5 to 120 seconds, the electric current being applied at 1 to 100 V for 10 to 360 seconds, and preferably 2 to 60 V for 30 to 180 seconds; and the like. According to the method of the present invention, a multilayer coating film with reduced unevenness and high corrosion resistance is obtained even when method (1) above, in which application of electric current is not performed, is used.

The mechanism of the chemical conversion coating film deposition is such that the immersion or electric current application increases the pH in the vicinity of the metal substrate and causes a hydrolysis reaction, allowing the metal ionic species in the chemical conversion treatment solution to deposit on the metal substrate as a poorly soluble chemical conversion coating film (metal oxide and/or a part of resin composition (P)), thereby forming a chemical conversion coating film containing the metal compound component (M) and/or the resin composition (P).

The metal substrate having the chemical conversion coating film formed thereon may be appropriately subjected to setting before being subjected to electrodeposition coating, and then immersed in a cationic electrodeposition coating composition tank filled with a cationic electrodeposition coating composition to perform electrodeposition coating. In this manner, an electrodeposition coating film is formed on the chemical conversion coating film. At this time, in the present invention, a part or all of the water-washing step, which was until now performed before electrodeposition coating, can be omitted.

As used herein, phrases such as "omitting (omission of) a part or all of the water-washing step," and "a part or all of the water-washing step is omitted" mean that at least one water-washing step selected from among industrial-water washing and/or clean-water washing, and pure-water washing can be omitted, in accordance with the required coating film properties. For example, omitting industrial-water washing and clean-water washing and performing only pure-water washing corresponds to "omitting a part or all of the water-washing step." Therefore, "omitting (omission of) a part or all of the water-washing step" or "a part or all of the water-washing step is omitted" indicates that, for example, either (i) industrial-water washing and/or clean-water washing or (ii) pure-water washing is performed, or neither (i) nor (ii) is performed. A method in which both washing (i) and (ii) above are performed, but a reduced amount of water in each washing is used so that the total amount of water used is equivalent to that used in a method in which at least one of (i) or (ii) above is omitted, is substantially equivalent to a method in which at least one of (i) or (ii) is omitted, in terms of the amount of water used. Therefore, in the present invention, this method is also included in the method in which "a part or all of the water-washing step is omitted."

The washing method described above may be immersion washing or spray washing (spray-atomizing washing, shower-spray washing). In the present invention, any method is appropriately used. To achieve process streamlining and space savings, to simplify effluent treatment, and to reduce waste products, it is preferable to use only spray washing. Spray washing removes excess chemical conversion treatment solution from a chemical conversion-treated substrate surface by spraying water generally for 1 to 120 seconds, and preferably for 2 to 60 seconds. In spray washing, when the substrate has a complicated shape (e.g., a car frame), it is not possible for the entire surface to be directly sprayed; thus, spraying may be performed only on the external surface, the finished appearance of which is considered to be the most important issue. Therefore, examples of a method in which a part or all of the water-washing step is omitted include a method comprising a step of spraying water for 120 seconds or less, and preferably 60 seconds or less. Examples of such a method also includes a method in which water washing is not performed.

To further achieve process streamlining and space savings, to further simplify effluent treatment, and to further reduce waste products, it is particularly more preferable to omit all of the water-washing step, such as industrial-water washing, clean-water washing, and pure-water washing, including immersion washing and spraywashing.

The setting before electrodeposition coating is performed under conditions at a temperature of generally 0 to 80° C., preferably 5 to 50° C., and more preferably 10 to 40° C. for generally 10 seconds to 30 minutes, preferably 20 seconds to 20 minutes, and more preferably 30 seconds to 15 minutes. In this manner, excess chemical conversion treatment solution attached to the metal substrate is removed, making it possible to achieve excellent electrodeposition coatability, and to obtain a multilayer coating film having excellent finished appearance and/or excellent corrosion resistance.

During the setting, the metal substrate may be appropriately subjected to at least one of air blowing, shaking, and rotating. In this manner, excess chemical conversion treatment solution attached to the metal substrate is removed to the maximum extent.

The air blowing may be performed on the substrate surface at an air pressure of generally 0.01 to 1.0 MPa, and preferably 0.05 to 0.5 MPa, for generally 1 second to 10 minutes, and preferably 2 seconds to 3 minutes, at a temperature of generally 0 to 80° C., and preferably 10 to 60° C. In this manner, excess chemical conversion treatment solution is removed from the substrate.

Next, the metal substrate having the chemical conversion coating film formed on it is immersed in a cationic electrodeposition tank filled with a cationic electrodeposition coating composition, followed by the application of electric current, thereby forming an electrodeposition coating film on the chemical conversion coating film.

Cationic Electrodeposition Coating Composition

The cationic electrodeposition coating composition used in the method for forming a multilayer coating film (step 2) of the present invention is not limited, and any known composition may be used. It is particularly preferable to use a composition containing an amino group-containing epoxy resin (A) and a blocked polyisocyanate (B). The cationic electrodeposition coating composition used in the present invention preferably contains the amino group-containing epoxy resin (A) in an amount of generally 40 to 90 mass %, preferably 55 to 85 mass %, and more preferably 60 to 80 mass %, based on the total resin solids content, as well as the blocked polyisocyanate (B) in an amount of generally 10 to 60 mass %, preferably 15 to 45 mass %, and more preferably 20 to 40 mass %, based on the total resin solids content.

Amino Group-Containing Epoxy Resin (A)

The amino group-containing epoxy resin (A) may be obtained by reacting an epoxy resin (a1) and an amine compound (a2), and optionally a modifier. Examples of amino group-containing epoxy resins include (1) adducts of an epoxy resin with a primary amine compound, a secondary amine compound, or a compound of a mixture of primary and secondary amines (see, for example, U.S. Pat. No. 3,984,299); (2) an adduct of an epoxy resin with a ketiminized amine compound (see, for example, U.S. Pat. No. 4,017,438); (3) a reaction product obtained by etherification of an epoxy resin with a hydroxy compound having a ketiminized primary amino group (see, for example, JP59-43013A); and the like.

Epoxy Resin (a1)

The epoxy resin (a1) usable in the production of the amino group-containing epoxy resin (A) include a compound containing at least one, fand preferably two or more, epoxy groups per molecule, and having a number average molecular weight of generally at least 300, preferably 400 to 4,000, and more preferably 800 to 2,500, and an epoxy equivalent of at least 160, preferably 180 to 2,500, and more preferably 400 to 1,500. In particular, an epoxy resin obtained by reacting a polyphenol compound and epihalohydrin is preferable.

Examples of polyphenol compounds that can be used for forming the epoxy resin (a1) include bis(4-hydroxyphenyl)-2,2-propane [bisphenol A], bis(4-hydroxyphenyl)methane [bisphenol F], bis(4-hydroxycyclohexyl)methane [hydrogenated bisphenol F], 2,2-bis(4-hydroxycyclohexyl)propane [hydrogenated bisphenol A], 4,4'-dihydroxybenzophenone, bis(4-hydroxyphenyl)-1,1-ethane, bis(4-hydroxyphenyl)-1,1-isobutane, bis(4-hydroxy-3-tert-butyl-phenyl)-2,2-propane, bis(2-hydroxynaphthyl)methane, tetra(4-hydroxyphenyl)-1,1,2,2-ethane, 4,4'-dihydroxydiphenylsulfone, phenol novolak, cresol novolak, and the like. These may be used singly or in a combination of two or more.

Preferable resins as the epoxy resin (a1) obtained by reacting a polyphenol compound with epichlorohydrin are preferably those derived from bisphenol A and represented by the following formula:

Examples of commercially available products of the epoxy resin (a1) include products sold under the trade names of jER828EL, jER1002, jER1004, and jER1007 by Mitsubishi Chemical Corporation.

The bisphenol-type epoxy resin may either be a resin obtained by condensing, for example, epichlorohydrin and bisphenol to a high molecular weight resin optionally in the presence of a catalyst, such as an alkali catalyst, or a resin obtained by condensing epichlorohydrin and bisphenol to a low molecular weight epoxy resin optionally in the presence of a catalyst, such as an alkali catalyst, and subjecting this low molecular weight epoxy resin to a polyaddition reaction with bisphenol.

In this specification, the number average molecular weight is a polystyrene equivalent molecular weight that is determined from the retention time (retention volume) measured by gel permeation chromatography (GPC) based on the retention time (retention volume) of a standard polystyrene with a known molecular weight measured under the same conditions. More specifically, the measurement is performed using a gel permeation chromatography apparatus (HLC8120GPC (trade name) produced by Tosoh Corporation) together with four columns (TSKgel G-4000HXL, TSKgel G-3000HXL, TSKgel G-2500HXL, and TSKgel G-2000XL, trade names, all produced by Tosoh Corporation) under the following conditions: mobile phase: tetrahydrofuran; measurement temperature: 40° C.; flow rate: 1 mL/min; and detector: RI.

Amine Compound (a2)

The amine compound (a2) used as a starting material of the amino group-containing epoxy resin (A) is not limited as long as it has reactivity with the epoxy resin (a1). Examples include monoalkylamines or dialkylamines, such as monomethylamine, dimethylamine, monoethylamine, diethylamine, dipropylamine, dibutylamine, dihexylamine, dioctylamine, monoisopropylamine, diisopropylamine, monobutylamine, monooctylamine, methylbutylamine, and dibutylamine; alkanolamines, such as monoethanolamine, N-methylethanolamine, N-ethylethanolamine, diethanolamine, mono(2-hydroxypropyl)amine, di(2-hydroxypropyl)amine, N-butylethanolamine, dipropanolamine, monomethylaminoethanol, N-(2-hydroxypropyl)ethylenediamine, 3-methylamine-1,2-propanediol, 3-tert-butylamino-1,2-propanediol, N-methylglucamine, and N-octylglucamine; alkylenepolyamines, such as polymethylenediamine, polyetherdiamine, ethylenediamine, propylenediamine, butylenediamine, hexamethylenediamine, trimethylhexamethylenediamine, dimethylaminopropylamine, diethylenetriamine, diethylaminopropylamine, dipropylenetriamine, dibutylenetriamine, bis(hexamethylene)triamine, bis(4-aminobutyl) amine, triethylenetetramine, tetraethylenepentamine, pentaethylenehexamine; aromatic or alicyclic polyamines, such as menthanediamine, isophoronediamine, bis(4-amino-3-methylcyclohexyl)methane, metaxylylenediamine, metaphenylenediamine, naphthylenediamine, and dimethylaminomethylbenzene; heterocyclic polyamines, such as piperazine, wherein n is preferably 0 to 8.

1-methylpiperazine, 3-pyrrolidinol, 3-piperidinol, and 4-pyrrolidinol; epoxy-added polyamines obtained by adding 1 to 30 mol of epoxy-containing compound per mol of the polyamines; polyamide polyamines that contains one or more primary or secondary amines in the polyamide resin molecule and that is produced by condensation of the polyamines with aromatic acid anhydrides, alicyclic acid anhydrides, aliphatic acid anhydrides, halogenated acid anhydrides and/or dimer acids; ketiminized amines obtained by reacting one or more primary or secondary amines of the polyamines with ketone compounds; and the like. These may be used singly or in a combination of two or more. The ketone compounds used for producing the ketiminized amines are not limited as long as they react with the primary or secondary amines of the polyamines to form a ketimine compound, and as long as they are hydrolyzed in an aqueous coating composition. Examples include methyl isopropyl ketone (MIPK), diisobutyl ketone (DIBK), methyl isobutyl ketone (MIBK), diethyl ketone (DEK), ethyl butyl ketone (EBK), ethyl propyl ketone (EPK), dipropyl ketone (DPK), methylethylketone (MEK), and the like. Of these, methyl isobutyl ketone (MIBK) is preferable. These ketones may be used singly or in a combination of two or more.

It is preferable for the amino group-containing epoxy resin (A) to have an amine value of 40 to 80 mg KOH/g, and more preferably 45 to 65 mg KOH/g, to achieve excellent corrosion resistance of the resulting coating film and to prevent unevenness of the coating film when dried.

Modifier

The amino group-containing epoxy resin (A) may be optionally modified with a modifier. The modifier is not limited as long as it is a resin or compound that are reactive with the epoxy resin (a1). Examples include acidic compounds, such as acetic acid, propionic acid, butyric acid, valeric acid, acrylic acid, oleic acid, glycolic acid, lactic acid, benzoic acid, gallic acid, fatty acid, and dibasic acid; monohydric alcohols, such as methanol, ethanol, n-propanol, isopropanol, n-butanol, 2-butanol, pentanol, hexanol, n-octanol, 2-ethylhexanol, dodecyl alcohol, stearyl alcohol, and benzyl alcohol; polyols; polyether polyols; polyester polyols; polyamide amines; polyisocyanate compounds; lactones, such as γ-butyrolactone and ε-caprolactone; compounds obtained by reacting polyisocyanate compounds with lactones, such as ε-caprolactone; acrylic monomers; compounds obtained by polymerization reaction of one or more acrylic monomers; xyleneformaldehyde compounds; and the like. These may be used singly or in a combination of two or more.

The reaction of the epoxy resin (a1) with the amine compound (a2), and optionally with the modifier may be performed generally in an appropriate organic solvent at a reaction temperature of about 80 to 170° C., and preferably about 90 to 150° C., for about 1 to 6 hours, and preferably about 1 to 5 hours.

Examples of the organic solvent include hydrocarbon-based solvents, such as toluene, xylene, cyclohexane, and n-hexane; ester-based solvents, such as methyl acetate, ethyl acetate, and butyl acetate; ketone-based solvents, such as acetone, methyl ethyl ketone, methyl isobutyl ketone, and methyl amyl ketone; amide-based solvents, such as dimethylformamide, and dimethylacetamide; alcohol-based solvents, such as methanol, ethanol, n-propanol, and iso-propanol; ether alcohol-based compounds, such as ethylene glycol monobutyl ether, diethylene glycol monoethyl ether; mixtures of these organic solvents; and the like.

The amount of the modifier used is not strictly limited, and may be appropriately adjusted according to the usage, etc., of the cationic electrodeposition coating composition. To improve the finished appearance and the corrosion resistance, it is appropriate to use the modifier in an amount of 3 to 50 mass %, and preferably 5 to 30 mass %, based on the solids mass of the amino group-containing epoxy resin (A).

The amino group-containing epoxy resin (A) used in the present invention is not particularly limited. In addition to the above, the following resins may optionally be used: amino group-containing epoxy resins obtained by reacting an oxazolidinone ring-containing epoxy resins with amino group-containing compounds (e.g., JPH05-306327A); amino group-containing modified epoxy resins obtained by reacting epoxy resins having an alkylene oxide structure with amino group-containing compounds (e.g., JP2011-847723A); xyleneformaldehyde resin-modified amino group-containing epoxy resins obtained by reacting epoxy resins with xyleneformaldehyde resins and amino group-containing compounds (e.g., JP2003-221547A); and the like. These may be used singly or in a combination of two or more.

Blocked Plyisocyanate (B)

The blocked polyisocyanate (B) is a reaction product obtained by addition reaction of a polyisocyanate compound and an isocyanate blocking agent. The polyisocyanate compound used in the blocked polyisocyanate (B) is not limited and any known compounds may be used. Examples include aromatic polyisocyanate compounds, such as tolylene diisocyanate, xylylene diisocyanate, phenylene diisocyanate, diphenylmethane-2,2'-diisocyanate, diphenylmethane-2,4'-diisocyanate, diphenylmethane-4,4'-diisocyanate, and crude MDI [polymethylene polyphenyl isocyanate]; alicyclic polyisocyanate compounds, such as bis(isocyanatemethyl) cyclohexane and isophorone diisocyanate; aliphatic polyisocyanate compounds, such as tetramethylene diisocyanate, hexamethylene diisocyanate, and methylene diisocyanate; cyclized polymers or biurets of these polyisocyanate compounds; and combinations of these compounds.

To improve the corrosion resistance, it is particularly preferable to use aromatic polyisocyanate compounds, such as tolylene diisocyanate, xylylene diisocyanate, phenylene diisocyanate, diphenylmethane-2,4'-diisocyanate, diphenylmethane-4,4'-diisocyanate, and crude MDI.

The isocyanate blocking agent blocks isocyanate groups of polyisocyanate compounds through addition to the isocyanate groups. The blocked polyisocyanate compounds prepared through the addition are stable at room temperature. When heated to a film-baking temperature (generally about 100 to 200° C.), however, the blocking agent dissociates to thereby regenerate free isocyanate groups.

The isocyanate blocking agent used in the blocked polyisocyanate (B) is not limited and any known agent may be used. Examples include methylethylketoxime, cyclohexanone oxime and like oxime-based compounds; phenol, para-t-butylphenol, cresol, and like phenol-based compounds; n-butanol, 2-ethylhexanol, phenylcarbinol, methylphenylcarbinol, ethylene glycol monobutyl ether, diethylene glycol monoethyl ether, ethylene glycol, propylene glycol, and like alcohol-based compounds; ε-caprolactam, γ-butyrolactam, and like lactam-based compounds; dimethyl malonate, diethyl malonate, ethyl acetoacetate, methyl acetoacetate, acetylacetone, and like active methylene-based compounds; and the like. These may be used singly or in a combination of two or more.

Other Components of Cationic Electrodeposition Coating Composition

In addition to the components (A) and (B) above, the cationic electrodeposition coating composition may optionally contain, for example, a modified epoxy resin that is substantially free from amino groups and that is obtained by reacting an epoxy resin with a polyhydric alcohol, and a polyester resin obtained by reacting a polybasic acid with a polyhydric alcohol. The amount of the modified epoxy resin and/or the polyester resin, when contained in the cationic electrodeposition coating composition, is generally 3 to 50 parts by mass, preferably 10 to 45 mass %, based on 100 parts by mass of the total solids content of the components (A) and (B).

The cationic electrodeposition coating composition may further optionally contain various additives, such as a surfactant, a surface control agent, a pigment-dispersed paste, water, an organic solvent, a neutralizing agent, and the like, may be optionally used. These components may be sufficiently mixed, and dissolved or dispersed in water to prepare the cationic electrodeposition coating composition.

As the neutralizing agent, known organic acids and inorganic acids may be used without limitation. It is particularly preferable to use formic acid, lactic acid, acetic acid, or mixtures thereof.

The pigment-dispersed paste comprises a dispersion of fine particles of pigments such as a coloring pigment, a rust-preventive pigment, and an extender pigment. The pigment-dispersed paste may be prepared, for example, by mixing a resin for pigment dispersion, a neutralizing agent, and pigments, and subjecting the mixture to dispersion treatment in a dispersing mixer, such as a ball mill, a sand mill, or a pebble mill.

Known resins may be used as the resin for pigment dispersion. Examples include resins having hydroxyl and cationic groups, such as epoxy resins, acrylic resins; surfactants; tertiary amine-type epoxy resins; quaternary ammonium salt-type epoxy resins; tertiary sulfonium salt-type epoxy resins; and the like. These may be used singly or in a combination of two or more.

There is no particular limitation to the pigments above. Examples include coloring pigments, such as titanium oxide, carbon black, and colcothar; extender pigments, such as clay, mica, baryta, calcium carbonate, and silica; and rust-preventive pigments, such as aluminum phosphomolybdate, aluminum tripolyphosphate, and zinc oxide (zinc white); and the like.

To prevent corrosion, bismuth compounds may also be incorporated. Examples of bismuth compounds include organic acid bismuth, such as bismuth oxide, bismuth hydroxide, basic bismuth carbonate, bismuth nitrate, bismuth silicate, bismuth lactate, and bismuth salicylate.

To improve coating film curability, an organic tin compound, such as dibutyltin dibenzoate, dioctyltin oxide, and dibutyltin oxide, may be used.

Electrodeposition Coating

The cationic electrodeposition coating composition used in the method for forming a multilayer coating film (step 2) of the present invention may be used to perform electrodeposition coating on a metal substrate on which a chemical conversion coating film is formed without performing a part or all of the water-washing step. The electrodeposition coating is generally performed by adjusting the temperature of an electrodeposition bath to 15 to 35° C., and applying a current at a load voltage of 100 to 400 V using a substrate as a cathode. The coating composition bath comprises a cationic electrodeposition coating composition diluted with deionized water or the like to a solids content of about 5 to 40 mass %, and preferably 8 to 25 mass %, and to a pH of 1.0 to 9.0, and preferably 3.0 to 7.0.

In general, after the electrodeposition coating, the coated substrate is fully washed with ultrafiltrate (UF filtrate), reverse osmosis water (RO water), industrial water, pure water, or the like, to remove the cationic electrodeposition coating composition excessively adhered to the substrate.

The thickness of the electrodeposition coating film obtained by using the cationic electrodeposition coating composition is not particularly limited, but is generally 5 to 40 μm, and preferably 10 to 30 μm, based on the thickness of the dry coating film. The bake drying of the coating film is performed by heating the electrodeposition coating film at a surface temperature of the coated article of 110 to 200° C., and preferably 140 to 180° C., for 10 to 180 minutes, and preferably 20 to 60 minutes, with a dryer, such as an electric hot-air dryer or a gas hot-air dryer. By such bake drying, a cured coating film is obtained.

EXAMPLES

The present invention is explained in detail below with reference to Production Examples, Examples, and Comparative Examples; however, the present invention is not limited to these. In the Examples, "parts," "%," and "ppm" are by mass.

Production of Chemical Conversion Treatment Solution

Production Example 1

Aluminium nitrate, calcium nitrate, and potassium nitrate, which had been diluted with deionized water, and hexafluorozirconic acid were blended with deionized water under vigorous stirring using a dispersion mixture. The resulting mixture was further diluted with clean water and/or deionized water. Then, nitrate, sodium nitrate, ammonium nitrate, hydrofluoric acid, ammonia, and/or sodium hydroxide were added thereto so that the resulting mixture had a pH of 3.8, and contained 500 ppm of zirconium ions, 100 ppm of aluminum ions, 80 ppm of sodium ions, 80 ppm of potassium ions, and 80 ppm of calcium ions, as the metal elements. In this manner, chemical conversion treatment solution X-1 was obtained.

Production Examples 2 to 27

Chemical conversion treatment solutions X-2 to X-27 were obtained as in Production Example 1, except that the compositions shown in Table 1 below were used. The amount of magnesium ions was adjusted using magnesium nitrate.

TABLE 1

| | Production Example | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Chemical conversion treatment solution | X-1 | X-2 | X-3 | X-4 | X-5 | X-6 | X-7 | X-8 | X-9 | X-10 | X-11 | X-12 | X-13 |
| Sodium ion | 80 | 20 | 150 | 400 | 50 | 50 | 50 | 20 | 20 | 20 | 80 | 150 | 400 |

TABLE 1-continued

| | | | | | | | | | | | | | | |
|---|---|---|---|---|---|---|---|---|---|---|---|---|---|---|
| Potassium ion | | 80 | 20 | 50 | 50 | 150 | 400 | 600 | 20 | 20 | 20 | 600 | 150 | 400 |
| Calcium ion | | 80 | 20 | 50 | 50 | 50 | 50 | 50 | 120 | 400 | 600 | 600 | 120 | 400 |
| Magnesium ion | | | | | | | | | | | | | | |
| Metal | Zirconium ion | 500 | 500 | 500 | 500 | 500 | 500 | 500 | 500 | 500 | 500 | 500 | 500 | 500 |
| (M) | Aluminum ion | 100 | 100 | 100 | 100 | 100 | 100 | 100 | 100 | 100 | 100 | 100 | 100 | 100 |
| Resin | P-1 (Note 1) | | | | | | | | | | | | | |
| (M) | P-2 (Note 2) | | | | | | | | | | | | | |

| | | Production Example | | | | | | | | | | | | |
|---|---|---|---|---|---|---|---|---|---|---|---|---|---|---|
| | | 14 | 15 | 16 | 17 | 18 | 19 | 20 | 21 | 22 | 23 | 24 | 25 | 26 | 27 |
| Chemical conversion treatment solution | | X-14 | X-15 | X-16 | X-17 | X-18 | X-19 | X-20 | X-21 | X-22 | X-23 | X-24 | X-25 | X-26 | X-27 |
| Sodium ion | | 80 | 80 | 80 | 80 | 80 | 0 | 80 | 80 | 5 | 600 | 600 | 600 | 600 | 80 |
| Potassium ion | | 80 | 80 | 80 | 80 | 80 | 80 | 0 | 80 | 5 | 600 | 50 | 400 | 600 | 80 |
| Calcium ion | | 80 | 80 | 80 | 80 | 80 | 80 | 80 | 0 | 5 | 600 | 50 | 400 | 600 | 80 |
| Magnesium ion | | | | | | 80 | | | | | | | | | |
| Metal | Zirconium ion | 3000 | 6000 | 500 | 500 | 500 | 500 | 500 | 500 | 500 | 500 | 500 | 500 | 500 | 500 |
| (M) | Aluminum ion | 100 | 100 | 100 | 100 | 100 | 100 | 100 | 100 | 100 | 100 | 100 | 100 | 100 | 0 |
| Resin | P-1 (Note 1) | | | 500 | | | | | | | | | | | |
| (M) | P-2 (Note 2) | | | | | 500 | | | | | | | | | |

The amounts shown in the tables are all based on solids concentration (ppm) on a mass basis.

Note 1: P-1: PAA-01 (trade name, produced by Nitto Boseki Co., Ltd., polyallylamine, weight average molecular weight: 1,600).

Note 2: P-2: Mannich-modified, aminated phenolic resin. [120 parts of Maruka Lyncur S-2P (trade name, produced by Maruzen Petrochemical Co., Ltd., poly-4-vinylphenol) and 120 parts of ethylene glycol monobutyl ether were placed in a flask equipped with a stirrer, a thermometer, a dropping funnel, and a reflux condenser, and the mixture was heated to 90° C. to dissolve poly-4-vinylphenol. Subsequently, 35 parts of monomethylethanolamine, 40 parts of 37% formalin, 10 parts of ethylene glycol monobutyl ether were added thereto, and the mixture was reacted at 90° C. for 4 hours, followed by further addition of ethylene glycol monobutyl ether to adjust the solids content to 40%.]

Production Example 28

Zinc ion: 1,500 ppm
Nickel ion: 500 ppm
Phosphoric acid ion: 13,500 ppm
Fluorine ion: 500 ppm
Nitrate ion: 6,000 ppm
Nitrite ion: 100 ppm
Sodium ion: 80 ppm
Calcium ion: 80 ppm
Potassium ion: 80 ppm Chemical conversion treatment solution X-28 having the above composition was prepared.

Production Example 29

Zinc ion: 1,500 ppm
Nickel ion: 500 ppm
Phosphate ion: 13,500 ppm
Fluorine ion: 500 ppm
Nitrate ion: 6,000 ppm
Nitrite ion: 100 ppm
Sodium ion: 600 ppm
Calcium ion: 600 ppm
Potassium ion: 600 ppm Chemical conversion treatment solution X-29 having the above composition was prepared.

Production of Amino Group-Containing Epoxy Resin (A)

Production Example 30

1,200 parts of jER828EL (trade name, an epoxy resin produced by Japan Epoxy Resin Co., Ltd., epoxy equivalent: 190; number average molecular weight: 350), 500 parts of bisphenol A, and 0.2 parts of dimethylbenzylamine were placed in a flask equipped with a stirrer, a thermometer, a nitrogen-inlet tube, and a reflux condenser, and the mixture was reacted at 130° C. until the epoxy equivalent was 850.

Thereafter, 160 parts of diethanolamine and 65 parts of ketiminized product of diethylenetriamine and methyl isobutyl ketone were added, and the mixture was reacted at 120° C. for 4 hours, followed by addition of 480 g of ethylene glycol monobutyl ether to obtain an amino group-containing epoxy resin A-1 having solids content of 80%. This amino group-containing epoxy resin A-1 had an amine value of 59 mg KOH/g and a number average molecular weight of 2,100.

Production of Blocked Polyisocyanate (B)

Production Example 31

270 parts of Cosmonate M-200 (trade name, produced by Mitsui Chemicals, Inc., crude MDI, NCO group content: 31.3%), and 127 parts of methyl isobutyl ketone were placed in a reactor, and the mixture was heated to 70° C. Then, 236 parts of ethylene glycol monobutyl ether was added thereto dropwise over 1 hour, and the mixture was then heated to 100° C. While maintaining this temperature, the mixture was sampled over time, and infrared absorption spectroscopic measurements were performed to confirm no absorption of unreacted isocyanate groups. In this manner, a blocked polyisocyanate B-1 having a resin solids content of 80% was obtained.

Production of Resin for Pigment Dispersion

Production Example 32

450 parts of nonylphenol and 960 parts of CNE195LB (trade name, produced by Chang Chun Japan Co., Ltd., cresol novolac epoxy resin, glycidyl ether of novolac phenol resin) were placed in a flask equipped with a stirrer, a thermometer, a dropping funnel, and a reflux condenser. The mixture was gradually heated while mixing and stirring, and reacted at 160° C. After adding 430 parts of ε-caprolactone, the mixture was heated to 170° C. and reacted. Thereafter, 105 parts of diethanolamine, 147 parts of dimethylethanolamine, and 164 parts of lactic acid aqueous solution having a concentration of 90% were reacted, and elimination of almost all the epoxy groups were confirmed. Then, ethylene glycol monobutyl ether was added thereto, obtaining a resin for pigment dispersion having a solids content of 60%. This resin for pigment dispersion had an amine value of 70 mg KOH/g and a number average molecular weight of about 2,200.

Production of Pigment-Dispersed Paste

Production Example 33

8.3 parts (solids content: 5 parts) of the resin for pigment dispersion with a solids content of 60% obtained in Production Example 32, 14.5 parts of titanium oxide, 7.0 parts of refined clay, 0.3 parts of carbon black, 1 part of dioctyltin oxide, 1 part of bismuth hydroxide, and 20.3 parts of deionized water were dispersed in a ball mill for 20 hours, thereby obtaining a pigment-dispersed paste having a solids content of 55%.

Production of Cationic Electrodeposition Coating Composition

Production Example 34

87.5 parts (solids content: 70 parts) of amino group-containing epoxy resin A-1 obtained in Production Example 30 and 37.5 parts (solids content: 30 parts) of blocked polyisocyanate B-1 obtained in Production Example 31 were mixed, and 13 parts of 10% acetic acid was further added to the mixture. After the mixture was uniformly stirred, deionized water was added dropwise with vigorous stirring over a period of about 15 minutes to obtain an emulsion having a solids content of 34%.

Thereafter, 294 parts (solids content: 100 parts) of the emulsion obtained above, 52.4 parts (solids content: 28.8 parts) of 55% pigment-dispersed paste obtained in Production Example 33, and 350 parts of deionized water were mixed to obtain a cationic electrodeposition coating composition Y-1 having a solids content of 20%.

Production of Test Plate

Example 1

Test plate Z-1 was produced according to the following steps 1-1 to 2-3.
Step 1 (Degreasing, Surface Conditioning, and Chemical Conversion Treatment)
Step 1-1: A cold-rolled steel plate (70 mm×150 mm×0.8 mm) was degreased by immersion for 120 seconds in 2.0 mass % of Fine Cleaner L4460 (produced by Nihon Parkerizing Co., Ltd., an alkaline-degreasing agent) adjusted to 43° C.
Step 1-2: The steel plate above was subjected to surface conditioning by immersion for 30 seconds in a 0.15% aqueous solution of Preparen 4040N (produced by Nihon Parkerizing Co., Ltd., a surface control agent) at ordinary temperature, and the resulting product was washed by spraying pure water for 30 seconds.
Step 1-3: The above steel plate was subjected to chemical conversion treatment by immersion for 120 seconds in the chemical conversion treatment solution X-1 obtained in Production Example 1 adjusted to 43° C.
Step 2 (Washing, Electrodeposition Coating, and Bake Drying)
Step 2-1: The steel plate, on which a chemical conversion coating film was formed in step 1, was subjected to washing by immersion in pure water for 120 seconds (equivalent to water-washing step II mentioned later).
Step 2-2: The above steel plate was subjected to electrodeposition coating at 250 V for 180 seconds (voltage rise period: 30 s) by immersion in a bath of the cationic electrodeposition coating composition Y-1 (Production Example 34) adjusted to 28° C.
Step 2-3: The above steel plate was subjected to washing by immersion once in clean water for 120 seconds and once in pure water for 120 seconds, and to bake drying at 170° C. for 20 minutes in an electric drier, thereby obtaining test plate Z-1 having a multilayer coating film with a film thickness of 20 μm when dried.

Examples 2 to 31 and Comparative Examples 1 to 8

Test plates Z-2 to Z-39 were obtained as in Example 1, except that the chemical conversion treatment solutions and/or the water-washing steps shown in Table 2 below were used. With respect to the obtained test plates, tests were performed to evaluate the finished appearance, such as unevenness and corrosion resistance. Table 2 below also shows the evaluation results. The water-washing step used in the Examples and the Comparative Examples, and the method for evaluating unevenness and corrosion resistance are described below.
Water-Washing Step
The following describes the water-washing steps used in the Examples or the Comparative Examples. From the viewpoint of streamlining the step, a shorter step is preferable. Also from the viewpoints of economy and the environment, it is more preferable that the step uses less washing water. In the following water-washing steps II to V, a part or all of the step is omitted, based on known water-washing step I.
Water-washing step I: After chemical conversion treatment, a substrate is subjected to washing by immersion in clean water once for 120 seconds, followed by washing by immersion in pure water once for 120 seconds. This is a known water-washing step (water washing by immersion: twice or more) and is the longest step.
Water-washing step II: After chemical conversion treatment, a substrate is subjected to washing by immersion in pure water once for 120 seconds. This step omits a part of the washing step, compared to the known water-washing step (water washing by immersion: twice or more).
Water-washing step III: After chemical conversion treatment, a substrate is subjected to washing by atomized spray of pure water for 30 seconds. This step omits a part of the step, compared to the known water-washing step (water washing by immersion: twice or more), and is slightly shorter than water-washing step II, which comprises performing washing by immersion once.
Water-washing step IV: After chemical conversion treatment, a water-washing step is not performed, and a substrate is subjected to air blowing for 10 seconds (at room temperature and air pressure of 0.2 MPa on the substrate surface). This step is short, and no waste water is produced.
Water-washing step V: After chemical conversion treatment, no water-washing step is performed. This is the shortest step, and no waste water is produced.

Unevenness

The appearance of each of the obtained test plates was observed to evaluate unevenness as the finished appearance of multilayer coating films. The evaluation was performed based on the following criteria from A (very good) to E (poor).
A: Very uniform.
B: Uniform.
C: Mostly uniform though slight unevenness is visually confirmed.
D: Slightly poor with unevenness visually confirmed
E: Poor with obvious unevenness.

evaluated based on the width of rust and blistering from the cut according to the following criteria. The evaluation was performed based on the following criteria from A (very good) to E (poor).

A: The maximum width of rust and blistering from the cut was 2.0 mm or less (on one side).
B: The maximum width of rust and blistering from the cut was more than 2.0 mm and 2.5 mm or less (on one side).
C: The maximum width of rust and blistering from the cut was more than 2.5 mm and 3.0 mm or less (on one side).
D: The maximum width of rust and blistering from the cut was more than 3.0 mm and 3.5 mm or less (on one side).
E: The maximum width of rust and blistering from the cut was more than 3.5 mm (on one side).

TABLE 2

| | | Example | | | | | | | | | |
|---|---|---|---|---|---|---|---|---|---|---|---|
| | | Ex. 1 | Ex. 2 | Ex. 3 | Ex. 4 | Ex. 5 | Ex. 6 | Ex. 7 | Ex. 8 | Ex. 9 | Ex. 10 |
| Test plate | | Z-1 | Z-2 | Z-3 | Z-4 | Z-5 | Z-6 | Z-7 | Z-8 | Z-9 | Z-10 |
| Chemical conversion treatment solution | | X-1 | X-2 | X-1 | X-3 | X-4 | X-5 | X-6 | X-7 | X-8 | X-9 |
| Water-washing step | | II | III | III | III | III | III | III | III | III | III |
| Evaluation test | Unevenness | A | A | A | B | B | B | B | C | B | B |
| | Corrosion resistance | A | B | B | B | C | B | C | C | B | C |

| | | Example | | | | | | | | | |
|---|---|---|---|---|---|---|---|---|---|---|---|
| | | Ex. 11 | Ex. 12 | Ex. 13 | Ex. 14 | Ex. 15 | Ex. 16 | Ex. 17 | Ex. 18 | Ex. 19 | Ex. 20 |
| Test plate | | Z-11 | Z-12 | Z-13 | 2-14 | 2-15 | Z-16 | Z-17 | Z-18 | Z-19 | Z-20 |
| Chemical conversion treatment solution | | X-10 | X-11 | X-1 | X-3 | X-5 | X-8 | X-12 | X-13 | X-1 | X-12 |
| Water-washing step | | III | III | V | V | V | V | V | V | IV | IV |
| Evaluation test | Unevenness | C | C | B | B | B | B | B | C | A | B |
| | Corrosion resistance | C | C | B | C | C | C | C | C | B | C |

| | | Example | | | | | | | | | |
|---|---|---|---|---|---|---|---|---|---|---|---|
| | | Ex. 21 | Ex. 22 | Ex. 23 | Ex. 24 | Ex. 25 | Ex. 26 | Ex. 27 | Ex. 28 | Ex. 29 | Ex. 30 |
| Test plate | | Z-21 | Z-22 | Z-23 | Z-24 | Z-25 | Z-26 | Z-27 | Z-28 | Z-29 | Z-30 |
| Chemical conversion treatment solution | | X-14 | X-15 | X-16 | X-17 | X-18 | X-19 | X-20 | X-21 | X-22 | X-28 |
| Water-washing step | | V | V | V | V | V | V | V | V | V | V |
| Evaluation test | Unevenness | C | C | B | B | B | A | B | B | A | B |
| | Corrosion resistance | B | A | B | B | C | B | B | B | B | C |

| | | Example | | | | | | | | | |
|---|---|---|---|---|---|---|---|---|---|---|---|
| | | Ex. 31 | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | |
| Test plate | | Z-31 | Z-32 | Z-33 | Z-34 | 2-35 | Z-36 | Z-37 | Z-38 | Z-39 | |
| Chemical conversion treatment solution | | X-27 | X-23 | X-24 | X-24 | X-24 | X-24 | X-25 | X-26 | X-29 | |
| Water-washing step | | V | I | II | III | V | IV | V | V | V | |
| Evaluation test | Unevenness | A | A | C | D | D | D | D | D | E | |
| | Corrosion resistance | B | B | D | D | E | D | E | E | E | |

Corrosion Resistance

Each of the multilayer coating films was cross-cut with a knife so that the cut reached the test plate, and was then subjected to a salt spray test at 35° C. for 840 hours in accordance with JIS Z-2371. Corrosion resistance was

The invention claimed is:

1. A method for forming a multilayer coating film, the method consisting essentially of:
Step 1: immersing a metal substrate in a chemical conversion treatment solution to form a chemical conversion coating film; performing a water-washing step;

and optionally subjecting the metal substrate to at least one of air blowing, shaking, and rotating, and Step 2: performing electrodeposition coating on the metal substrate which has been subjected to the chemical conversion of Step 1, by using a cationic electrodeposition coating composition to form an electrodeposition coating film, wherein the chemical conversion treatment solution contains no less than 5 ppm and less than 50 ppm of sodium ions, no less than 5 ppm and less than 90 ppm of calcium ions, less than 100 ppm of potassium ions, and less than 90 ppm of magnesium ions on a mass basis, wherein the chemical conversion treatment solution comprises hexafluorozirconic acid, wherein the chemical conversion treatment solution is used continuously, wherein the water-washing step is performed in one step, and wherein the cationic electrodeposition coating composition contains an amino group-containing epoxy resin (A) and a blocked polyisocyanate (B), the amino group-containing epoxy resin (A) being contained in an amount of 40 to 90 mass %, and the blocked polyisocyanate (B) being contained in an amount of 10 to 60 mass %, based on the total resin solids content, wherein the chemical conversion treatment solution contains 150 to 2,000 ppm of at least one metal compound component (M) comprising at least one metal compound selected from zirconium, titanium, cobalt, aluminum, vanadium, tungsten, molybdenum, copper, zinc, indium, bismuth, yttrium, iron, nickel, manganese, gallium, silver, and lanthanoid metals, as the total metal content on a mass basis.

2. The method for forming a multilayer coating film according to claim 1,
wherein the chemical conversion treatment solution contains a water-dispersible or water-soluble resin composition (P) in an amount of 0.01 to 40 mass %.

3. The method for forming a multilayer coating film according to claim 1,
wherein the metal substrate is subjected to at least one of air blowing, shaking, and rotating, before performing electrodeposition coating in step 2.

4. The method for forming a multilayer coating film according to claim 1,
wherein the water-washing step consists of pure-water washing.

5. A coated article having a multilayer coating film formed by using the method for forming a multilayer coating film of claim 1.

* * * * *